United States Patent [19]

Yano et al.

[11] Patent Number: 5,229,463
[45] Date of Patent: Jul. 20, 1993

[54] THERMOPLASTIC RESIN COMPOSITIONS HAVING IMPROVED STRENGTH AND METHOD FOR PRODUCING THEM

[75] Inventors: Kazunori Yano; Akiharu Wakayama, both of Yokkaichi, Japan

[73] Assignee: Mitsubishi Petrochemical Company Limited, Tokyo, Japan

[21] Appl. No.: 792,784

[22] Filed: Nov. 15, 1991

[30] Foreign Application Priority Data

Nov. 16, 1990 [JP] Japan .................................. 2-310944
Sep. 12, 1991 [JP] Japan .................................. 3-261097

[51] Int. Cl.$^5$ .......................... C08L 9/06; C08L 23/06
[52] U.S. Cl. ...................................... 525/240; 525/194; 525/232; 525/236; 525/237; 525/242; 524/504; 524/526; 524/528
[58] Field of Search ................. 524/528, 526; 525/194, 525/240, 242, 232, 236, 237

[56] References Cited

U.S. PATENT DOCUMENTS

| | | | |
|---|---|---|---|
| 3,758,643 | 9/1973 | Fischer | 525/240 |
| 4,833,210 | 5/1989 | Fujii et al. | 525/387 |
| 4,906,694 | 3/1990 | Yonekura et al. | 525/237 |

Primary Examiner—Paul R. Michl
Assistant Examiner—Olga Asinovsky
Attorney, Agent, or Firm—Koda and Androlia

[57] ABSTRACT

A thermoplastic resin composition which comprises 100 parts by weight of a copolymer of propylene with at least one particular diene monomer or a mixture of said propylene copolymer with another crystalline propylene polymer, of the content of the diene monomer polymerized of 0.05 to 20 mol %; 90 to 300 parts by weight of an olefin copolymer rubber that can be crosslinked by dynamic heat treatment with a crosslinking agent; 50 to 1900 parts by weight relative to a total of 100 parts by weight of the 1st and 2nd components of a crystalline propylene polymer; and 0 to 100 parts by weight relative to a total of 100 parts by weight of the 1st, 2nd and 3rd components of a filler.

55 Claims, 3 Drawing Sheets

THERMOPLASTIC RESIN COMPOSITIONS HAVING IMPROVED STRENGTH AND METHOD FOR PRODUCING THEM

BACKGROUND OF THE INVENTION

1. Field of the Art

The present invention relates to a thermoplastic resin composition which comprises a polyolefin, esp., a polypropylene-based polymer containing a specific diene monomer and an olefin polymer rubber, in which the dispersion of the rubber is improved, and which is not only has high strength but also has an excellent balance between moldability, rigidity and impact strength. This invention is concerned also with a method for producing such a resin composition.

2. Related Art

Propylene based polymers have been used as resins useful for general purposes due to their relatively improved moldability, heat resistance and mechanical strength. However, a major problem in their utilization in the form of automotive parts and electric appliance parts is that their rigidity and impact strength at low temperature are inadequate. For possible solution for this problem, the utilization of various fillers or various rubber is being considered. Furthermore, dynamic crosslinking carried out by heat treatment of a particular type of rubber in a dynamic state is now under investigation—see, for instance, JP-A-48(1973)-26838, JP-A-52(1977)-13541, JP-A-53(1978)-81554, JP-A-1(1989)-259074, JP-A-1(1989)-292065, JP-A-2(1990)-60951 and JP-A-2(1990)-73846 specifications.

However, there is still much room left for improvement in the above mentioned propylene polymers with respect to retention of moldability, rigidity and impact strength or maintenance of good balance between them and solvent resistance.

SUMMARY OF THE INVENTION

In view of the foregoing problems, it is an object of this invention to make significant improvements in the prior art, thereby providing a thermoplastic resin composition which has such high levels of moldability, rigidity and impact strength and excellent balance between them as required in automotive parts and other like fields. It is another object to provide a method for producing this resin composition.

As a result of intensive studies made on various additives for thermoplastic resin compositions, we have now found that a thermoplastic resin composition obtained by blending together a propylene-based copolymer having a specific diene monomer and a specific olefin copolymer rubber is much improved not only in strength but also in moldability, rigidity and impact strength.

According to one aspect of the present invention, presented is a thermoplastic resin composition which comprises:

Component (A), in an amount of 100 parts by weight, which is a copolymer of propylene with at least one diene monomer selected from the monomers represented by the following formulae I and II or a mixture of said propylene copolymer with another crystalline propylene polymer, the component (A) containing the diene monomer polymerized in an amount of 0.05 to 20 mol %,

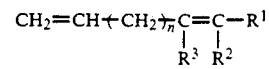

wherein
$R^1$ if a $C_{1-8}$ alkyl group,
$R^2$ and $R^3$ are each independently a hydrogen atom or a $C_{1-8}$ alkyl group, provided that both can never be hydrogen atoms at the same time, and
n is a number of 1 to 10.

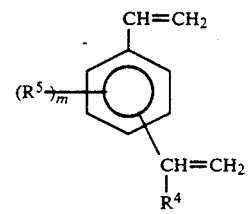

wherein
$R^4$ is a hydrogen atom or a methyl group,
$R^5$ is a $C_{1-6}$ hydrocarbyl group, and
m is a number of 0 or 1;

Component (B), in an amount of 90 to 300 parts by weight, which is an olefin copolymer rubber that can be crosslinked by dynamic heat treatment with a crosslinking agent;

Component (C), in an amount of 50 to 1900 parts by weight relative to a total of 100 parts by weight of the components (A) and (B), which is a crystalline propylene polymer; and Component (D), in an amount of 0 to 100 parts by weight relative to a total of 100 parts by weight of the components (A), (B) and (C), which is a filler.

According to another aspect of the present invention, presented is a method of producing thermoplastic resin compositions which comprises the steps of:

(i) mixing together the following components (A) and (B) in a (A)/(B) weight ratio of 100/90 to 100/300 to obtain a blend of a structure consisting of a continuous phase and a disperse phase in which the component (B) is in the continuous phase, and (ii) dynamically heat-treating said blend in the presence of a crosslinking agent to obtain a thermoplastic resin composition wherein the component (A) is in the continuous phase:

Component (A) which is a copolymer of propylene with at least one diene monomer selected from the monomers represented by the following formulae I and II or a mixture of said propylene copolymer with another crystalline propylene polymer, the component (A) containing the diene monomer polymerized in an amount of 0.05 to 20 mol %, and having a melt flow rate of 0.1 to 50 g/10 min,

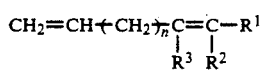

wherein
$R^1$ is a $C_{1-8}$ alkyl group,
$R^2$ and $R^3$ are each independently a hydrogen atom or a $C_{1-8}$ alkyl group, provided that both can never be hydrogen atoms at the same time, and
n is a number of 1 to 10,

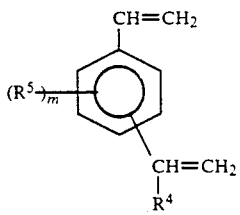

wherein
$R^4$ is a hydrogen atom or a methyl group,
$R^5$ is a $C_{1-6}$ hydrocarbyl group, and
m is a number of 0 or 1; and Component (B) which is an olefin copolymer rubber that can be crosslinked by dynamic heat treatment with a crosslinking agent and has a Mooney viscosity $ML_{1+4}$ of 120 to 30 as measured at 100° C.

Another method of producing thermoplastic resin compositions according to this invention comprises:

(i) mixing together the following components (A) and (B) in a (A)/(B) weight ratio of 100/90 to 100/300 to obtain a blend of a structure consisting of a continuous phase and a disperse phase in which the component (B) is in the continuous phase;

(ii) dynamically heat-treating said blend in the presence of a crosslinking agent to obtain a thermoplastic resin composition wherein the component (A) is in the continuous phase;

(iii) adding to said thermoplastic resin composition obtained the following components (C) and (D) in amounts of, for the component (C), 50 to 1900 parts by weight relative to a total of 100 parts by weight of the components (A) and (B) and for the component (D), 0 to 100 parts by weight relative to a total of 100 parts by weight of the components (A), (B) and (C), and (iv) hot-kneading the resulting mixture.

Component (A) which is a copolymer of propylene with at least one diene monomer selected from the monomers represented by the following formulae I and II or a mixture of said propylene copolymer with another crystalline propylene polymer, the component (A) containing the diene monomer polymerized in an amount of 0.05 to 20 mol %, and having a melt flow rate of 0.1 to 50 g/10 min,

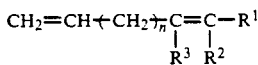

wherein
$R^1$ is a $C_{1-8}$ alkyl group,
$R^2$ and $R^3$ are each independently a hydrogen atom or a $C_{1-8}$ alkyl group, provided that both can never be hydrogen atoms at the same time, and
n is a number of 1 to 10,

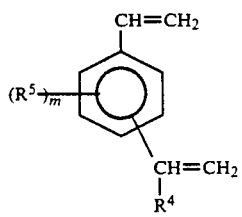

wherein $R^4$ is a hydrogen atom or a methyl group,
$R^5$ is a $C_{1-6}$ hydrocarbyl group, and
m is a number of 0 or 1;

Component (B) which is an olefin copolymer rubber that can be crosslinked by dynamic heat treatment with a crosslinking agent and has a Mooney viscosity $ML_{1+4}$ of 120 to 30 as measured at 100° C.;

Component (C) which is a crystalline propylene polymer; and

Component (D) which is a filler.

The thermoplastic resin compositions according to this invention have high levels of moldability, rigidity and impact strength and excellent balance between them.

Therefore, the thermoplastic resin compositions according to this invention lend themselves particularly suitable for injection-molding automotive parts such as bumpers and instrument panels and housings for appliance parts.

BRIEF DESCRIPTION OF THE DRAWINGS

The present invention will now be explained in greater detail, by way of example, with reference to the accompanying drawings, in which.

Figure 1:
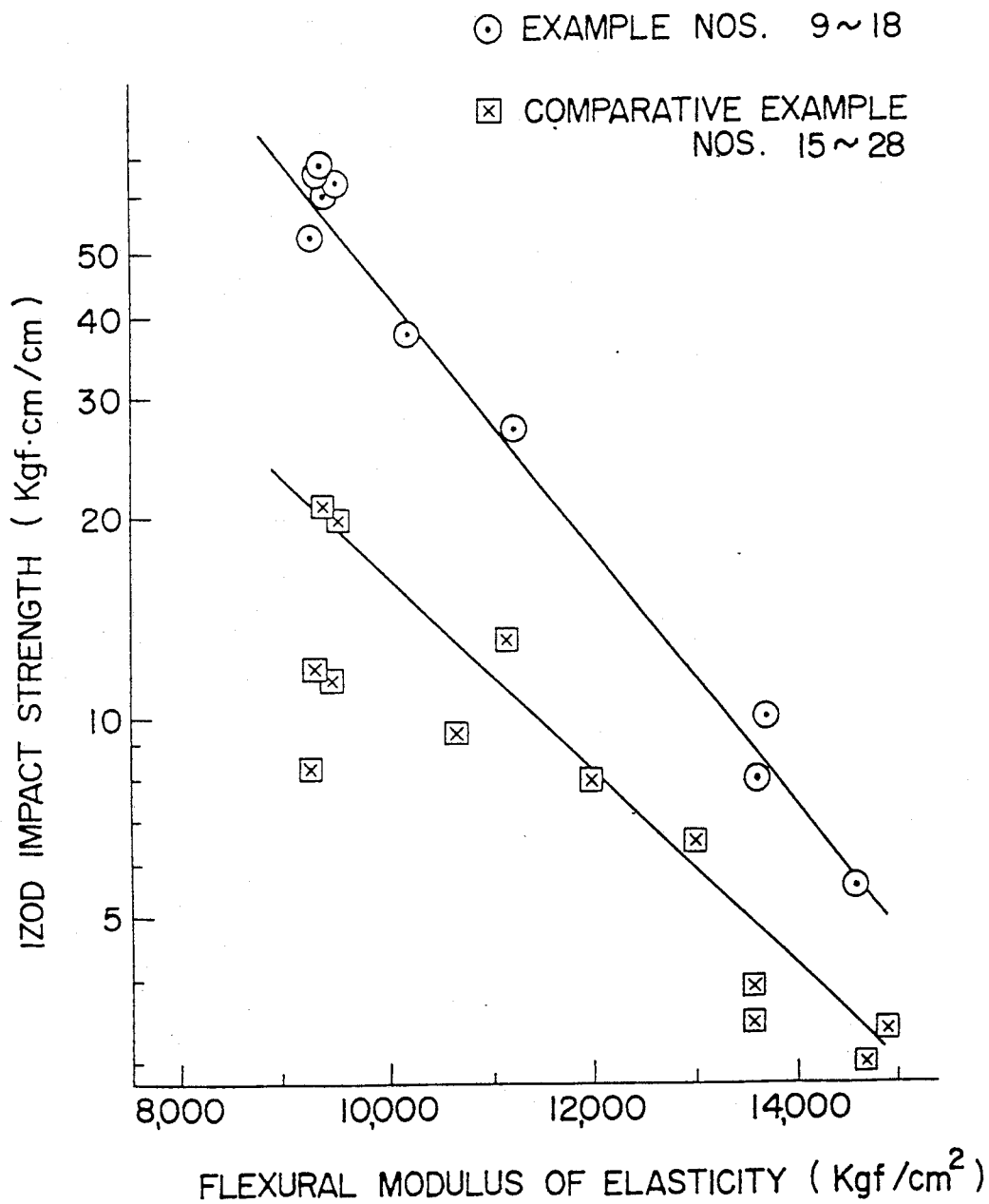
FIG. 1 is a graph with Izod impact strength as ordinate and flexural modulus of elasticity as abscissa, showing an improvement in physical properties achieved by this invention.
Figure 2:
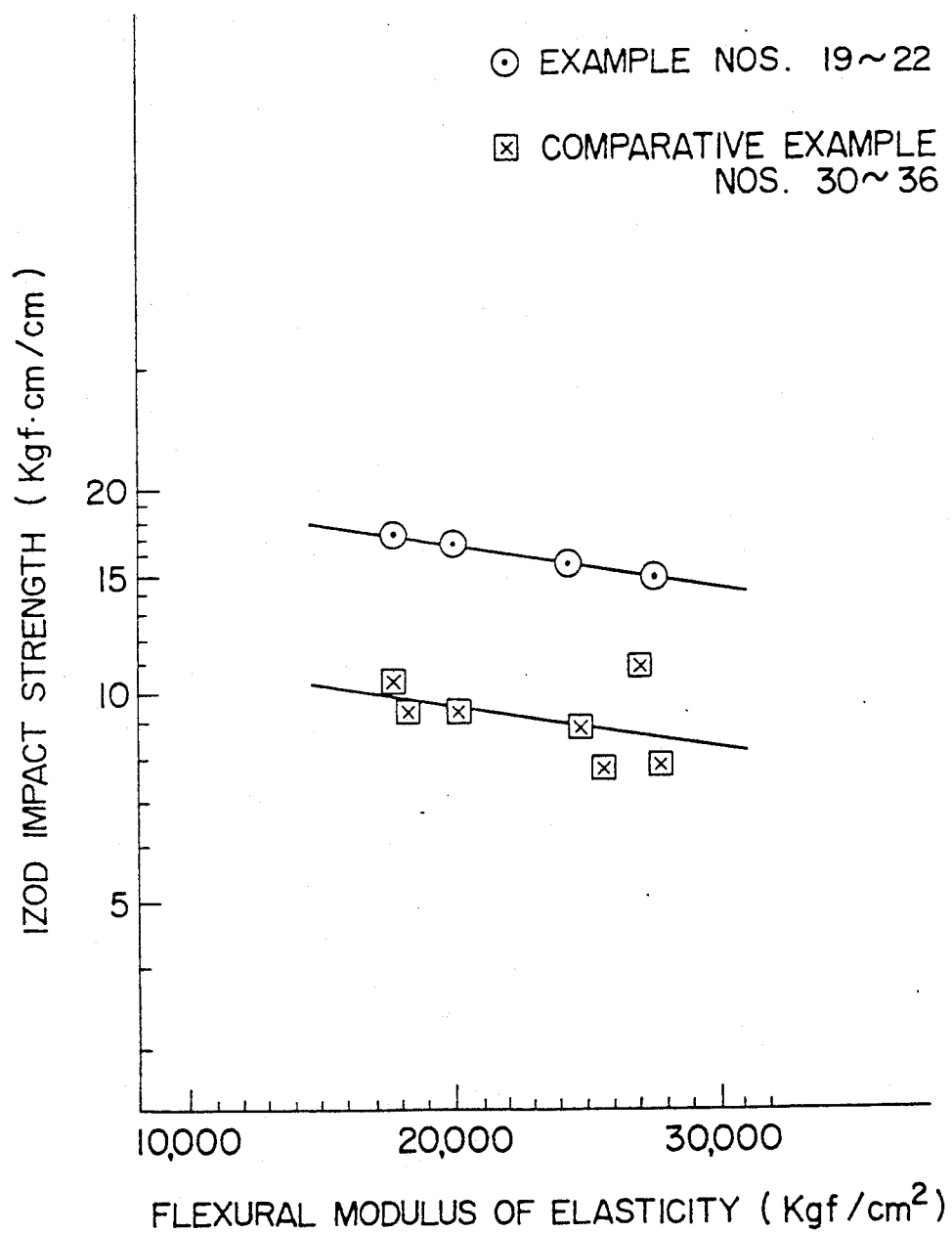
FIG. 2 is a graph similar to that of FIG. 1.

DETAILED DESCRIPTION OF THE INVENTION (1) Components

Component (A)

The component (A) used in this invention is a copolymer of propylene with at least one diene monomer selected from the diene monomers having the following general formulae I and II or a mixture of said propylene copolymer with another crystalline propylene polymer, wherein the component (A) contains 0.05 to 20 mol % of the diene monomer polymerized.

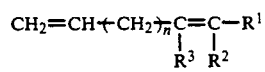

wherein
$R^1$ is a $C_{1-8}$, preferably $C_{1-4}$, alkyl group,
$R^2$ and $R^3$ are each independently a hydrogen atom or a $C_{1-8}$, preferably $C_{1-4}$, alkyl group, provided that they can never be hydrogen atoms at the same time, and
n is a number of 1 to 10, preferably 1 to 6.

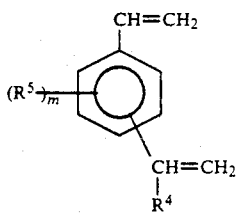

wherein $R^4$ is a hydrogen atom or a methyl group, $R^5$ is a $C_{1-6}$, preferably $C_{1-4}$, hydrocarbyl group, and m is a number of 0 or 1.

More specifically, the component (A) includes, for instance:

(i) a copolymer of propylene with either one or both of these dienes, which has a diene monomer (polymerized) content of 0.05 to 20 mol %, (ii) a mixture of (a) a copolymer of propylene with one and/or the other of these dienes with (b) a copolymer of propylene with one and/or the other of these dienes, provided that the latter is different in diene from the former (e.g., a mixture of a copolymer of propylene with one diene with a copolymer of propylene with the other diene), said mixture having a diene monomer content of 0.05 to 20 mol %, (iii) a mixture of said (i) and/or (ii) with a polypropylene polymer other than the component (A), which may be the same as the component (c) but should be used in an amount less than that of the component (C) used, more specifically less than that of the component (A) used, said mixture having a diene monomer content of 0.05 to 20 mol %, and (iv) copolymers (i), mixtures (ii) or mixtures (iii) in which the propylene contains a small amount of a co-monomer (other than the diene monomers having Formulae I and II).

Component (A) of the classes (i) and (ii) is preferable.

Examples of the branched, non-conjugated dienes represented by Formula I include:

(i) 1,4-dienes (i.e., n=1 in the Formula I), for instance, 4-methyl-1,4-hexadiene, 5-methyl-1,4-hexadiene, 4,5-dimethyl-1,4-hexadiene, 4-ethyl-1,4-hexadiene, 5-ethyl-1,4-hexadiene, 4,5-diethyl-1,4-hexadiene, 4-methyl-1,4-heptadiene, 5-methyl-1,4-heptadiene, 4,5-dimethyl-1,4-heptadiene, 4-ethyl-1,4-heptadiene, 5-ethyl-1,4-heptadiene, 4,5-diethyl-1,4-heptadiene, 4-methyl-1,4-octadiene, 5-methyl-1,4-octadiene, 4,5-dimethyl-1,4-octadiene, 4-ethyl-1,4-octadiene, 5-ethyl-1,4-octadiene, 4,5-diethyl-1,4-octadiene, 4-methyl-1,4-nonadiene, 5-methyl-1,4-nonadiene, 4,5-dimethyl-1,4-nonadiene, 4-ethyl-1,4-nonadiene, 5-ethyl-1,4-nonadiene and 4,5-diethyl-1,4-nonadiene, (ii) 1,5-dienes (i.e., n=2), for instance, 5-methyl-1,5-heptadiene, 6-methyl-1,5-heptadiene, 5,6-dimethyl-1,5-heptadiene, 5-ethyl-1,5-heptadiene, 6-ethyl-1,5-heptadiene, 5,6-diethyl-1,5-heptadiene, 5-methyl-1,5-octadiene, 6-methyl-1,5-octadiene, 5,6-dimethyl-1,5-octadiene, 5-ethyl-1,5-octadiene, 6-ethyl-1,5-octadiene, 5,6-diethyl-1,5-octadiene, 5-methyl-1,5-nonadiene, 6-methyl-1,5-nonadiene, 5,6-dimethyl-1,5-nonadiene, 5-ethyl-1,5-nonadiene, 6-ethyl-1,5-nonadiene and 5,6-diethyl-1,5-nonadiene, (iii) 1,6 dienes (i.e., n=3), for instance, 6-methyl-1,6-octadiene, 7-methyl-1,6-octadiene, 6,7-dimethyl-1,6-octadiene, 6-ethyl-1,6-octadiene, 7-ethyl-1,6-octadiene, 6,7-diethyl-1,6-octadiene, 6-methyl-1,6-nonadiene, 7-methyl-1,6-nonadiene, 6,7-dimethyl-1,6-nonadiene, 6-ethyl-1,6-nonadiene, 7-ethyl-1,6-nonadiene and 6,7-diethyl-1,6-nonadiene, and (iv) 1,7-dienes (i.e., n=4), for instance, 7-methyl-1,7-nonadiene, 8-methyl-1,7-nonadiene, 7,8-dimethyl-1,7-nonadiene, 7-ethyl-1,7-nonadiene, 8-ethyl-1,7-nonadiene and 7,8-diethyl-1,7-nonadiene.

Among these, preference is given to such branched, non-conjugated dienes as 6-methyl-1,5-heptadiene, 6-methyl-1,5-octadiene, 6-methyl-1,6-octadiene, 7-methyl-1,6-octadiene and 8-methyl-1,7-nonadiene, among which greater preference is given to 6-methyl-1,6-octadiene and 7-methyl-1,6-octadiene and the greatest preference to 7-methyl-1,6-octadiene.

The dialkenylbenzenes represented by Formula II may be used in the form of any of their isomers such as o-, m- or p-isomers, or alternatively mixtures thereof. They may have their benzene rings substituted by the group $R^5$ as well. More specifically, use may be made of divinylbenzenes, isopropenylstyrenes, divinyltoluenes, etc. Divinylbenzenes are most preferable.

It is to be understood that these non-conjugated dienes may be used in the form of mixtures of two or more. Propylene copolymers having these diene units represented by Formulae I and/or II may be produced by any known method such as those set forth in JP-A-1(1989)-118510 and 56(1981)-30414 specifications.

The copolymer of the diene monomer(s) with propylene as the component (A), may or may not additionally contain another α-olefin or unsaturated monomer as a minor component, on the condition that it contains propylene as a major component and a specific amount of the diene monomer having Formula I or II is contained therein. Other α-olefins or unsaturated monomers used, for instance, may be ethylene, butene-1, vinyl acetate, styrene and vinylsilane, which may be contained in the component (A) in random, block, graft or any other desired form.

The amount of the compound having Formula I or II in the polymeric component (A) lies in the range of 0.05 to 20 mol %, more particularly in the range of preferably 0.15 to 12 mol %, more preferably 0.2 to 6 mol %, for the compound I and preferably 0.05 to 8 mol %, more preferably 0.1 to 2 mol %, for the compound II. At less than the lower limit, little improvement in compatibility or physical properties would be achieved, while at higher than the upper limit, some local gelation would take place.

The polymeric component (A) has a melt flow rate (MFR for short, as measured at 230° C. under a load of 2.16 kg) lying in the range of 0.1 to 50 g/10 min., preferably 0.2 to 50 g/10 min., more preferably 0.3 to 40 g/10 min., even more preferably 0.3 to 30 g/10 min. and most preferably 0.3 to 25 g/10 min. Both ranges of MFR values less than 0.1 g/10 min. and higher than 50 g/10 min. are undesirable, in part because the olefin copolymer rubber would deteriorate on crosslinking and in part because the mechanical strength level of the resulting thermoplastic resin composition would drop.

Component (B)

The component (B) is an olefin copolymer rubber that can be crosslinked by dynamic heat treatment with a crosslinking agent. More specifically, the component (B) is understood to mean a type of rubber, like ethylene-propylene rubber, ethylene-propylene-butadiene rubber or ethylene-butadiene rubber, that is an amorphous elastic copolymer composed mainly of an olefin and crosslinked by dynamic heat treatment with a crosslinking agent (and a crosslinking aid), so that its fluidity can drop. The wording "dynamic heat treatment" as used herein, details of which will be described later, means that the material is hot-kneaded in a temperature range to be specified later (i.e. usually at 150°–250° C.).

Of these copolymer rubbers, preference is given to ethylene-propylene copolymer rubbers, and copolymers of ethylene-propylene- an unconjugated diene such as, e.g., ethylene-propylene-dicyclopentadiene copolymers, ethylene-propylene-dicyclooctadiene copolymers, ethylene-propylene-methylene-norbornene copolymers or ethylene-propylene-ethylene-norbornene copolymers, among which ethylene-propylene-dicyclopentadiene copolymers and ethylene-propylene-ethylidene-norbornene copolymers are most preferable. The copolymer rubber should have a Mooney viscosity $ML_{1+4}$ (100° C.) of 120 to 30, preferably 110 to 30 and more preferably 100 to 30. The use of such rubber yields a thermoplastic resin composition well balanced between its physical properties. For the crosslinking agents used, see what will be set forth later.

Component (C)

The component (C) is a crystalline propylene polymer. By the term "crystalline", is meant a polymer having a crystallinity of 20% or more as measured by X-ray diffractometry (or by the method described by G. Natta et al in "Rend. Accad. Naz. Lincei.", 22(8), 11(1987) for propylene polymer resin). The term "propylene polymer" as used in the present disclosure means not only a propylene homopolymer but also a copolymer of propylene with another monomer copolymerizable with it. Accordingly, the component (C) is understood to include random, block or other forms of copolymers of propylene with an α-olefin including ethylene or their mixture, to say nothing of the propylene homopolymer. For the copolymers, two or three or more different species of α-olefins may be used. Of these, the propylene homopolymer or copolymers containing at least 50% by weight of polypropylene are desired, but particular preference is given to crystalline propylene-based polymers, i.e., crystalline propylene homopolymer and crystalline random or block copolymers of propylene-ethylene because of their mechanical properties remaining well balanced. These polymers may be obtained by known polymerization and modification techniques, but some suitable commercial products may be used to this end as well. As a matter of course, both may be used in combination.

The crystalline propylene polymer as the component (C) should have a melt flow rate (MFR; as measured at 230° C. under a load of 2.16 kg) lying in the range of preferably 0.01 to 400 g/10 min., more preferably 0.15 to 300 g/10 min. and most preferably 0.5 to 200 g/10 min. At MFR values less than 0.01 g/10 min., problems would be likely to arise in relation to moldability, while at values higher than 400 g/10 min., there would be a drop of mechanical strength.

Component (D)

For the component (D), any desired types of fillers now available as additives for resinous materials may be used. More illustratively, use may be made of fibrous forms of fillers of, such as, calcium silicate, potassium titanate, gypsum, silicon carbide, carbon, glass, iron, copper and zinc; plate or spherical-forms of fillers of, such as, talc, mica, calcium carbonate, clay, silica, magnesium hydroxide, aluminium hydroxide and carbon black; and powdery forms of fillers of, such as, iron, copper and zinc.

These are fillers known so far for resin-reinforcing purposes, but may have an additional advantage of being capable of imparting flame retardancy and electrical conductivity to resinous materials at the same time.

The fibrous fillers used should preferably have a diameter of 0.01 to 20 μm, esp., 0.05 to 16 μm and an aspect ratio of 4 to 5000, esp., 10 to 2000. Generally speaking, larger aspect ratios are more preferred, but fibrous fillers having a diameter below 0.05 μm are more likely to break due to their low mechanical strength, while fibrous fillers having a diameter exceeding 16 μm are unlikely to break but must be added in a larger quantity, resulting in an increase in the weight of the end composition. Sheet- or spherical-forms of fillers should preferably have an average particle size of 0.01 to 10 μm, esp., 0.1 to 5 μm.

Crosslinking Agent

Comprehensively, the crosslinking agent used in this invention is classified into two types: one type that enables molecules to be bonded together directly, i.e., with "bridges" being virtually absent between the molecules so bonded, typically an organic peroxide, and the other type that itself serves as "bridges" between the molecules bonded, typically sulfur. In either case, the crosslinking agent must have a relevant thermal decomposition or crosslinking-initiating temperature of its own because the crosslinking reaction involved must take place through the "dynamic heat treatment". When the crosslinking agent used has neither a relevant thermal decomposition or crosslinking-initiating temperature nor a decomposition or reaction temperature, a crosslinking aid may be used in combination with it. Therefore, it should be noted that whenever referred to elsewhere in the present disclosure, the term "crosslinking agent" implies that it is used in combination with such a crosslinking aid.

As such crosslinking agents, use may generally be made of materials which have been used so far, or are being now employed, in the art for resin or rubber-crosslinking purposes. By way of example, sulfur, sulfur compounds, p-benzoquinonedioxime, alkylphenol-formaldehyde resins, brominated alkylphenol-formaldehyde resins, bis-maleimide compounds, ammonium benzoate, amino resins, organometal compounds and organic peroxides may be used. These crosslinking agents may be used alone or in combination.

Examples of organic peroxides include di-tert. butyl peroxide, benzyl peroxide, dicumenyl peroxide, tert. butyl perbenzoate, 2,2'-di(tert. butylperoxy)butane, and 2,2'-azobisisobutyronitrile.

Preferable crosslinking agent is an organic peroxide including dialkyl peroxide, R-O-O-R, and diacyl peroxide, RCO-O-O-COR.

Some crosslinking agents are known to accelerate crosslinking reactions more efficiently when used in combination of a certain compound, i.e. a crosslinking aid, than when not. When sulfur or sulfur compounds are used as the crosslinking agents, such aids can be thiurams, typically tetramethylthiuram disulfide and tetramethylthiuram monosulfide; thiazoles, typically benzothiazyl disulfide and mercaptobenzothiazole; guanidines, typically diphenylguanidine; oxides, typically zinc oxide and magnesium oxide; acids typically stearic acid and oleic acid; and so on. When organic peroxides are used as the crosslinking agents, on the other hand, they can be polymers such as liquid polybutadienes, dimaleimide compounds, polyfunctional monomers such as divinylbenzene and so on.

Of these crosslinking agents, the organic peroxides are preferred. For instance, the organic peroxides used in this invention include:

(i) hydroperoxides, typically t-butyl-hydroperoxide, cumene-hydroperoxide, 2,5-dimethylhexane-2,5-dihydroperoxide, 1,1,3,3-tetramethylbutyl-hydroperoxide, p-methane-hydroperoxide and di-isopropylbenzene hydroperoxide, (ii) dialkyl peroxides, typically 2,5-dimethyl-2,5-di(t-butyl peroxy)hexine-3, di-t-butyl-peroxide, t-butylcumyl-peroxide, 2,5-dimethyl-2,5-di(t-butyl peroxy)hexane and di-cumylperoxide, (iii) peroxy ketals, typically 2,2-bis-t-butyl peroxybutane, 2,2-bis-t-butyl peroxy-octane, 1,1-bis-t-butyl peroxy-cyclohexane and 1,1-bis-t-butyl peroxy-3,3,5-trimethylcyclo-hexane, (iv) peroxy esters, typically di-t-butyl peroxy isophthalate, t-butyl peroxy benzoate, t-butyl peroxy acetate, 2,5-di-methyl-2,5-di-benzoyl peroxy-hexane, 5-butyl peroxy isopropyl carbonate and t-butyl peroxy isobutylate, and (v) diacyl peroxides, typically benzoyl peroxide, m-toluoyl peroxide and acetyl peroxide.

Of these, 2,5-dimethyl-2,5-di(t-butyl peroxy)hexine-3, di-t-butyl peroxide, 2,5-di-methyl-2,5-di(t-butyl peroxy)hexane, di-cumyl peroxide, t-butyl benzoate and t-butyl peroxy isopropyl carbonate are preferred in view of their decomposition temperature and reactivity, among which the greatest preference is given to t-butyl benzoate, di-cumyl peroxide and di-t-butyl peroxide.

As mentioned earlier, such crosslinking aids as p-quinonedioxime, N,N'-m-phenylenedimaleimide, divinylbenzene, triallyl cyanurate and ethyleneglycol dimethacrylate may also be used. Of these, N,N'-m-phenylenedimaleimide and divinylbenzene are preferred in view of the ease of their handling as well as their dispersibility and reactivity with respect to blends comprising polypropylene and an organic peroxide crosslinking type of olefin copolymer rubber. As long as the intended purpose is achieve such additives as thermal stabilizers and age-resistant agents may also be used.

(2) Compositional Proportion of Components

Set out below are the proportions of the components in the thermoplastic resin composition according to this invention.

The thermoplastic resin composition according to this invention may be produced by the phase inversion method, for which the compositional ratio of the components (A) and (B) is important. It is then noted that between that compositional ratio and the viscosities of the components (A) and (B), there is a particular relation. To put it another way, between the compositional ratio and the viscosities of the components (A) and (B) there is a sort of correlation that becomes a factor important enough for achieving phase inversions.

The compositional proportion of the component (A) to (B) lies in the range of 100/90 to 100/300, but this is true when the component (A) has a melt flow rate of 0.1 to 50 g/10 min. (as measured at 230° C. according to JIS-K-7210) while the component (B) has a Mooney viscosity $ML_{1+4}$ of 120 to 30 as measured at 100° C.

Preferably, the compositional ratio of (A) to (B) should lie in the range of 100/90 to 100/300 when (A) has a melt flow rate of 0.2 to 50 g/100 while (B) has a Mooney viscosity $ML_{1+4}$ of 110 to 30 (at 100° C.). More preferably, the compositional ratio of (A) to (B) should lie in the range of 100/100 to 100/280 when (A) has a melt flow rate of 0.3 to 40 g/10 min. while (B) has a Mooney viscosity of 110 to 30 and, still more preferably, it should lie in the range of 100/110 to 100/270 when (A) has a melt flow rate of 0.3 to 30 g/10 min. while (B) has a Mooney viscosity $ML_{1+4}$ of 100 to 30 (at 100° C.). Most preferably, the compositional ratio of (A) to (B) should lie in the range of 100/120 to 100/250 when (A) has a melt flow rate of 0.3 to 25 g/10 min. while (B) has a Mooney viscosity $ML_{1+4}$ of 100 to 30 (at 100° C.).

At less than 90 parts by weight, the component (B) would introduce little improvement in impact strength, while at higher than 300 parts by weight, it would cause deteriorations of moldability and rigidity.

The proportion of the component (C) should lie in the range of 50 to 1,900 parts by weight, preferably 100 to 1,800 parts by weight and most preferably 200 to 1,700 with respect to a total of 100 parts by weight of the components (A) and (B). At less than 50 parts by weight, there would be deteriorations of moldability and rigidity, while at higher than 1,900 parts by weight, little improvement would be introduced in impact strength.

The proportion of the component (D) should lie in the range of 0 to 100 parts by weight, preferably 10 to 90 parts by weight and most preferably 15 to 70 parts by weight with respect to a total of 100 parts by weight of the components (A), (B) and (C). In smaller amounts little improvement would be introduced in rigidity, while in amounts exceeding 100 parts there would be a drop of moldability.

The amount of the crosslinker incorporated should lie in the range of 0.01 to 5 parts by weight and preferably 0.02 to 2 parts by weight with respect to a total of 100 parts by weight of the components (A) and (B). The amount of the crosslinking aid added should lie in the range of 0.05 to 5 parts by weight and preferably 0.1 to 3 parts by weight on the same basis. The crosslinking agent and aid take part in the intramolecular reaction of the olefin copolymer rubber and in the intermolecular reaction of the particular propylene copolymer, and would introduce little improvement in respective amounts less than 0.01 and 0.05 parts by weight while they would cause deteriorations of moldability and other properties in respective amounts exceeding 5 parts by weight.

(3) Production

As already mentioned, the thermoplastic resin compositions of this invention are produced by using the so-called phase inversion method, which makes it easy to obtain a thermoplastic resin composition in which the olefin copolymer rubber is suitably crosslinked together and the olefin copolymer rubber is crosslinked to the particular copolymer of propylene with the diene monomer, and which assumes a structure such that the olefin copolymer rubber is finely dispersed. According to the phase inversion method used in this invention, the components (A) and (B) are first mixed together or otherwise formed into a mixture containing the component (B) in the form of a continuous phase. Then, the component (B) is subjected to an accelerated crosslinking reaction or, in the term used herein, the dynamic heat treatment, in a hot-kneaded state, thereby increasing the viscosity of the component (B) phase. As the viscosity increases, the component (B), which is initially in a continuous phase, is mixed with the component (A) to produce a continuous phase of both the components (A) and (B), which finally gives rise to a mixture having the components (A) and (B) in continuous and non-continuous phases, respectively. The thus obtained mixture provides a thermoplastic resin composition containing a suitably crosslinked product of the olefin copolymer rubber with the particular copolymer of propylene with the diene monomer and consisting of a structure in which the suitably crosslinked olefin copolymer rubber is finely dispersed.

For the production of the thermoplastic resin compositions according to this invention, a variety of equipment available for blending resins together or these resins with stabilizers and colorants may be used. For instance, the components in either powdery or particular form may be first mixed together by means of a Henschel mixer, a supermixer, a ribbon blender or a V-blender to obtain a mixture in which they are uniformly dispersed. Then, the mixture may be hot-kneaded with such suitable means as a monoaxial or twinaxial kneading extruder, rolls, a Banbury mixer, a plastomill or a Brabender Plastograph. In this invention, particular preference is given to carrying out hot kneading in an inert gas, e.g., nitrogen gas atmosphere. The hot kneading is carried out ordinarily at 150° to 250° C., preferably 170° to 230° C. The components (C) and (D) are added to the thermoplastic resin composition obtained through such a phase inversion. Thereafter, the end thermoplastic resin composition can be obtained by plasticization by kneading.

The present method can be practiced by continuous procedures wherein the components (C) and (D) are added to a hot-kneaded product of the components (A) and (B) and then hot-kneaded, by batchwise procedures wherein an intermediate product obtained from the components (A) and (B) is cooled and solidified into a particulate material, which is then mixed with the components (C) and (D), and then hot-kneaded, or by other suitable procedures.

EXAMPLES

The present invention will now be described more specifically but not exclusively with respect to the following experimental examples.

Described below are the polymer components used.

Component (A) (i) Polyolefins a-1, a-3 and a-6

These are all polypropylene resins made by Mitsubishi Petrochemical Co., Ltd., with the grade names and melt flow rates (in g/10 min. This unit is used elsewhere in the present disclosure) set forth below.

| | Grade Names | Melt Flow Rates in g/10 min. |
|---|---|---|
| a-1: | MA8 | 0.6 |
| a-3: | MA4 | 5 |
| a-6: | MA3 | 11 |

(ii) Polyolefin a-5:

This is an ethylene propylene copolymer resin made by Mitsubishi Petrochemical Co., Ltd., with the grade name and melt flow rate set forth below.

| | Grade Names | Melt Flow Rate in g/10 min. |
|---|---|---|
| a-5: | BC3G | 10 |

(iii) Polyolefin a-2:

This is a mixture of 50 parts by weight of a propylene copolymer containing 0.4 mol % of divinylbenzene polymerized (synthesized by the following procedures) with 50 parts by weight of a propylene copolymer containing 4 mol % of 7-methyl-1,6-octadiene.

(1) Synthesis of the Divinylbenzene-Containing Propylene Copolymer

Into an autoclave having an internal volume of 100 liters, which had been repeatedly purged with propylene, were charged 50 liters of dehydrated and deoxygenized n-heptane, 4.5 liters of divinylbenzene (Tokyo Kasei K.K.), 23.4 g of diethylaluminium dichloride and 10 g of titanium trichloride ("TTA-12" made by Toyo Staufer K.K.) together with 45 liters of hydrogen for a 3-hour polymerization under a total propylene pressure of 5 Kg/cm$^2$G at 65° C.

After the completion of the polymerization, the reaction mixture was filtered to obtain 11.6 kg of the copolymer.

This copolymer was found to have a divinylbenzene content of 0.4 mol %, as analyzed by ultraviolet spectroscopy.

(2) Synthesis of the Propylene Copolymer Containing 7-Methyl-1,6-Octadiene

Preparation of a Supported Catalyst

Introduced into a flask which had been fully purged with nitrogen were 1 liter of dehydrated and deoxygenized n-heptane and then 1.0 mole of MgCl$_2$ and 2.0 moles of Ti(O.nC$_4$H$_9$)$_4$ for a 2-hour reaction at 100° C. After the completion of the reaction, the reaction system was cooled to a temperature of 40° C., and 150 ml of methylhydrogen polysiloxane was introduced thereinto for a further 3-hour reaction. After the completion of the reaction, the solid component was washed with n-heptane and sampled to analyze its composition. This indicated that it had a Ti content of 15.2% by weight and an Mg content of 4.2% by weight.

Introduced into a flask which had been fully purged with nitrogen were 1 liter of dehydrated and deoxygenized n-heptane and then 0.3 moles, as calculated as atomic Mg, of the above-synthesized component. Furthermore, 0.5 moles of SiCl$_4$ was introduced into the reaction system at 30° C. over a period of 15 minutes for a 2-hour reaction at 90° C. After the completion of the reaction, the reaction product was washed with purified n-heptane. Subsequently, a mixture of 250 ml of n-heptane with 0.04 moles of o-C$_6$H$_4$(COCl)$_2$ at 50° C. and then 0.5 moles of SiCl$_4$ were introduced into the reaction system for a 2-hour reaction at 90° C.

After the completion of the reaction, the product was washed with n-heptane to obtain a catalyst component found to have a Ti content of 2.03% by weight.

Production of Copolymer

Put into a 100-liter volume autoclave which had been purged with propylene were 30 liters of n-heptane together with 9.0 g of triethyl aluminium, 4.0 g of diphenyl dimethoxysilane and 10.0 g of the supported catalyst obtained by the aforesaid method. Then, 12.5 liters of hydrogen was added, which step was followed by the supply under pressure of propylene and stirring at 50° C. and 0.5 Kg/cm²G. Thereafter a further 12 liters of 7-methyl-1,6-octadiene was added, and the reaction system was heated with the supply-under-pressure of propylene and held at 70° C. and 7 Kg/cm2G for polymerization, followed by the deactivation of the catalyst with n-butanol. Thereafter the catalyst residue was extracted with water, and the copolymer was recovered by centrifugation and dried to obtain 19.3 Kg of the powders.

This copolymer was found to have a melting peak at 152.3° C. as measured by DSC and a 7-methyl-1,6-octadiene content of 4.0 mol % as determined by $H^1$-NMR analysis.

(iv) Polyolefin a-7:

This is a modification of Polyolefin a-2, in that it is a propylene copolymer containing 4 mol % of 7-methyl-1,6-octadiene with no copolymer of divinylbenzene with propylene blended.

(v) Polyolefins a-8 and a-9:

These are each a propylene polymer prepared by such procedures as described below, which contains 2.5 mol % of 7-methyl-1,6-octadiene with no divinylbenzene-propylene copolymer blended. The aforesaid procedures for synthesizing and preparing the 7-methyl-1,6-dioctadiene containing propylene polymers were followed with the exception that the amounts of hydrogen fed under pressure were changed to 90 liters and 0.5 liters, the amounts of 7-methyl-1,6-octadiene to 6.6 liters and 7.5 liters and the polymerization temperature to 70° C. and 55° C., respectively, thereby obtaining propylene copolymers with the melt flow rates set forth below.

|  | Melt Flow Rates in g/10 min. | Contents of 7-methyl-1,6-octadiene in mol % |
| --- | --- | --- |
| a-8 | 230 | 2.5 |
| a-9 | 0.04 | 2.5 |

Component (B)

Olefin Copolymer Rubbers b-1 and b-2

These rubbers are ethylene-propylene-norbornene resins made by Nippon Gosei Gomu K.K. (Japan Synthetic Rubber), with the grade names and properties stated below.

|  | Grade Names | Mooney Viscosities $ML_{1+4}$ at 100° C. | Iodine Values |
| --- | --- | --- | --- |
| b-1 | EP57P | 88 | 15 |
| b-2 | EP33 | 45 | 26 |

Olefin Copolymer Rubbers b-3 and b-4

These are ethylene-propylene-norbornene resins manufactured by Mitsubishi Petrochemical Co., Ltd., on an experimental basis, with the properties stated below.

|  | Mooney Viscosities $ML_{1+4}$ at 100° C. | Iodine Values |
| --- | --- | --- |
| b-3 | 130 | 16 |
| b-4 | 25 | 16 |

Component (C)

The same components as mentioned above, say a-3, a-5 and a-6 were used to this end.

Component (D)

d-1: Gypsum fibers made by Onoda Cement Co., Ltd.
Diameter 0.1 to 1.5 μm
Aspect Ratio: 30 to 200
d-2: Talc made by Fuji Talc K.K.
Average Particle Size: Sheet-form, 4 μm Crosslinking agent Di-t-butyl peroxide ("Perbutyl D") made by Nippon Yushi K.K.

Crosslinking Aid

N,N'-meta-phenylene-diamide

Reference Example 1

With a Brabender Plastograph, 25 parts by weight of Polyolefin a-1, 15 parts by weight of Polyolefin a-2 and 60 parts by weight of Olefin Copolymer Rubber b-1 were kneaded together at 190° C. and 160 rpm for 5 minutes in a nitrogen atmosphere (this kneading step will hereinafter be called the first step), followed by a further 10-minute kneading (this kneading step will hereinafter be called the second step). The thus obtained kneaded product was pulverized into a thermoplastic resin composition.

EXAMPLE 1

Added to a kneaded product similar to that obtained after the completion of the first step in Reference Example 1 were 0.05 parts by weight of the crosslinking agent and 1.5 parts by weight of the crosslinking aid, and a 10-minute kneading was further carried out. Upon confirmation of the completion of the reaction through observation of the kneading torque changes, the obtained kneaded product was pulverized into a thermoplastic resin composition.

EXAMPLE 2

Blended with a kneaded product similar to that obtained after the completion of the second step in Reference Example 1 was 300 parts by weight of Polyolefin a-1, and the blend was kneaded together at 210° C. and 80 rpm for 5 minutes by using a Brabender Plastograph (this kneading step will hereinafter be called the third step). The kneaded product was pulverized as in Example 1 to obtain a thermoplastic resin composition.

EXAMPLE 3

Blended with a kneaded product similar to that obtained after the completion of the second step in Example 1 was 300 parts by weight of Polyolefin a-1 as carried out in Example 2, and the third step was performed under similar conditions as in Example 2. The obtained kneaded product was likewise pulverized into a thermoplastic resin composition.

COMPARATIVE EXAMPLES 1 TO 5

With the components blended in the proportions set forth in Table 1, the 1st, 2nd and 3rd steps were carried out under similar conditions as described in Examples 1, 2, and 3, and the thus obtained kneaded products were each likewise pulverized into a thermoplastic resin composition.

EXAMPLES 5 AND 6 AND COMPARATIVE EXAMPLES 6 TO 12

With the types of polyolefins and olefin copolymer rubbers set forth in Table 3 and using the crosslinking agent and aid at such varied amounts as specified therein, the procedures of Examples 1, 2, and 3 were followed to obtain thermoplastic resin compositions. Examples 7 and 8 and Comparative Examples 13 to 14.

With the types of polyolefins and olefin copolymer rubbers set forth in Table 5 and using the crosslinking agent and aid at such varied amounts as specified therein, the procedures of Examples 1, 2, and 3 were followed to obtain thermoplastic resin compositions.

RESULTS OF EVALUATION

The powdery thermoplastic resin compositions obtained in Reference Example 1, Examples 1 to 8 and Comparative Examples 1 to 14 were press-molded into sheets, out of which test pieces were cut to determine their properties. The results are set forth in Tables 2, 4 and 6.

Molding Conditions

Temp. 230° C.
Pressure 50/100 Kg/cm$^2$
Time: 1/1 minute

Melt Flow Rate measured at 230° C. according to JIS K-7210.

Izod Impact Strength measured with a notch at 23° C. according to JIS K-7110.

Flexural Modulus of Elasticity measured at 23° C. according to JIS K-7203.

Tensile Properties

Through a miniature injection molding machine (Minimax), the powdery thermoplastic resin compositions were molded into dumbbell-shaped test pieces, whose tensile properties were then measured at 23° C. according to JIS K-7113.

TABLE 1

| | | | Ref. Ex. 1 | Examples 1 | 2 | 3 | Comp. Examples 1 | 2 | 3 | 4 | 5 |
|---|---|---|---|---|---|---|---|---|---|---|---|
| Compositions | 1st step | Polyolefin a-1 | 25 | 25 | 25 | 25 | 40 | 40 | 40 | 25 | 25 |
| | | Polyolefin a-2 | 15 | 15 | 15 | 15 | 0 | 0 | 0 | 15 | 15 |
| | | Olefin copolymer rubber b-1 | 60 | 60 | 60 | 60 | 60 | 60 | 60 | 140 | 30 |
| | 2nd step | Crosslinking agent | 0 | 0.05 | 0 | 0.05 | 0 | 0.05 | 0 | 0.05 | 0.05 |
| | | Crosslinking Aid | 0 | 1.5 | 0 | 1.5 | 0 | 1.5 | 0 | 1.5 | 1.5 |
| | 3rd step | Polyolefin a-1 | 0 | 0 | 300 | 300 | 0 | 0 | 300 | 0 | 300 |
| Melt Flow Rates of a-1 & a-2 | | | 1.2 | 1.2 | 1.2 | 1.2 | 0.6 | 0.6 | 0.6 | 1.2 | 1.2 |
| Mooney Viscosity of b-1 | | | 88 | 88 | 88 | 88 | 88 | 88 | 88 | 88 | 88 |

TABLE 2

| | | | Ref. Ex. 1 | Examples 1 | 2 | 3 | Comp. Examples 1 | 2 | 3 | 4 | 5 |
|---|---|---|---|---|---|---|---|---|---|---|---|
| Physical Properties | Melt Flow Rate | g/10 min | 3.9* | 0.23* | 0.91 | 0.82 | 3.2* | 0.20* | 0.86 | No flow* | 1.0 |
| | Tensile Properties | Strength at break Kg f/cm$^2$ | 114 | 169 | — | — | 95 | 141 | — | 150 | — |
| | | Elongation at break % | 181 | 282 | — | — | 109 | 256 | — | 310 | — |
| | Impact Strength | Kg fcm/cm | — | — | 58.9 | 70.9 | — | — | 31.0 | — | 18.0 |
| | Flexural Modulus of Elasticity | Kg f/cm$^2$ | — | — | 8600 | 8700 | — | — | 8800 | — | 9800 |

*measured at a 5-kg load; the rest at a 2.16 kg load.

TABLE 3

| | | | Examples 5 | 6 | Comp. Examples 6 | 7 | 8 | 9 | 10 | 11 | 12 |
|---|---|---|---|---|---|---|---|---|---|---|---|
| Compositions | 1st step | Polyolefin | 25 a-3 | 25 a-3 | 0 | 40 a-3 | 25 a-3 | 15 a-6 | 15 a-1 | 25 a-1 | 25 a-1 |
| | | Polyolefin | 15 a-2 | 15 a-2 | 0 | 0 | 15 a-2 | 25 a-8 | 25 a-9 | 15 a-2 | 15 a-2 |
| | | Olefin copolymer rubber | 60 b-2 | 60 b-2 | 0 | 60 b-2 | 30 b-2 | 60 b-1 | 60 b-1 | 60 b-3 | 60 b-4 |
| | 2nd step | Crosslinking agent | 0.02 | 0.05 | 0 | 0.02 | 0.05 | 0.05 | 0.05 | 0.05 | 0.05 |
| | | Crosslinking Aid | 0.2 | 0.6 | 0 | 0.2 | 0.6 | 0.6 | 0.6 | 0.6 | 0.6 |
| | 3rd step | Polyolefin a-5 | 300 | 300 | 300 | 300 | 300 | 300 | 300 | 300 | 300 |
| Melt Flow Rates of polyolefins | | | 3.5 | 3.5 | — | 5 | 3.5 | 60 | 0.08 | 1.2 | 1.2 |
| Mooney Viscosity of olefin copolymer rubber | | | 45 | 45 | — | 45 | 45 | 88 | 88 | 130 | 25 |

TABLE 4

|  |  |  | Examples | | Comp. Examples | | | | | | |
|---|---|---|---|---|---|---|---|---|---|---|---|
|  |  |  | 5 | 6 | 6 | 7 | 8 | 9 | 10 | 11 | 12 |
| Physical Properties | Melt Flow Rate | g/10 min | 6.7 | 5.9 | 8.6 | 6.2 | 8.9 | 8.1 | 4.7 | 3.0 | 9.8 |
|  | Tensile Properties | Strength at break Kg f/cm$^2$ | — | — | — | — | — | — | — | — | — |
|  |  | Elongation at break % | — | — | — | — | — | — | — | — | — |
|  | Impact Strength | Kg fcm/cm | 38.1 | 47.6 | 10.8 | 32.0 | 21.0 | 24.0 | 21.0 | 26.0 | 22.0 |
|  | Flexural Modulus of Elasticity | Kg f/cm$^2$ | 7100 | 7300 | 10500 | 6900 | 8900 | 6800 | 6900 | 7000 | 6700 |

TABLE 5

|  |  |  | Examples | | Comp. Examples | |
|---|---|---|---|---|---|---|
|  |  |  | 7 | 8 | 13 | 14 |
| Compositions | 1st step | Polyolefin | 25 a-3 | 25 a-6 | 25 a-3 | 25 a-6 |
|  |  | Polyolefin a-2 | 15 | 15 | 0 | 0 |
|  |  | Olefin copolymer rubber b-1 | 60 | 60 | 60 | 60 |
|  | 2nd step | Crosslinking agent | 0.05 | 0.05 | 0.05 | 0.05 |
|  |  | Crosslinking Aid | 0.6 | 0.6 | 0.6 | 0.6 |
| Melt Flow Rates of polyolefin & a-2 | | | 3.5 | 7.0 | 5 | 11 |
| Mooney Viscosity of b-1 | | | 88 | 88 | 88 | 88 |

TABLE 6

|  |  |  | Examples | | Comp. Examples | |
|---|---|---|---|---|---|---|
|  |  |  | 7 | 8 | 13 | 14 |
| Physical Properties | Melt Flow Rate | g/10 min | 0.48* | 0.79* | 0.43* | 0.71* |
|  | Tensile Properties | Strength at break Kg f/cm$^2$ | 160 | 156 | 142 | 132 |
|  |  | Elongation at break % | 265 | 246 | 238 | 221 |

*measured at a 5-kg load.

EXAMPLES 9 TO 14

Each of mixtures of the components (A) and (B) was kneaded together in the proportions stated in Table 7 through a twin axial kneading extruder working at 200° C. and 150 rpm in a nitrogen atmosphere, and the melt was then cooled and solidified in particulate form. The obtained particulate product was hot-kneaded together with the specific amounts of the crosslinking agent and crosslinking aid through the same twin axial kneading extruder, and the melt was then cooled and solidified in particulate form. Added to the obtained particulate product were the specific quantity of the component (C) as well as 1,3,5-tris(4-t-butyl-3-hydroxy-2,6-dimethylbenzyl)cyanuric acid and tetrakis(methylene-3-(3′,5′-di-t-butyl-4-hydroxyphenyl)propionate)methane, each in a quantity of 0.05 parts by weight per a total of 100 parts by weight of the components (A), (B) and (C), and then hot-kneaded through the same twin kneading extruder working at 220° C. and 200 rpm. The melt was then cooled and solidified to obtain a particulate thermoplastic resin composition.

COMPARATIVE EXAMPLES 15 TO 20

Using the feeds set forth in Table 7, the procedures of Examples 9 to 14 were followed to obtain particulate thermoplastic resin compositions.

EXAMPLES 15 & 17 AND COMPARATIVE EXAMPLES 23 & 27

A twin kneading extruder with an aperture of 44 mm and an L/D ratio of 42.5 was provided. This extruder included screws having three kneading portions, each provided with an input inlet and a feeder positioned on its upstream side. The components (A) and (B) were blended together in the proportions set forth in Table 8, and each of the blends was fed through the first input inlet to the extruder in a total (A)+(B) amount of 10 Kg per hour. The first kneading portion was worked at a cylinder temperature of 200° C. Added to the melt leaving the first kneading portion were the crosslinking agent diluted with a solvent and the crosslinking aid through the second input inlet, the former via a pump and the latter via a gravitational powder feeder. The second kneading portion was put in operation at a cylinder temperature of 240° C. Added to the melt leaving the second kneading portion was 40 Kg per hour of the component (C) through the 3rd input inlet, in which the same additives as used in Examples 9 to 14 had been preblended together in the respective amounts of 0.05 parts per a total of 100 parts of the components (A)+(B)+(C). The 3rd kneading portion operated at a cylinder temperature of 230° C. with the screw rotating at 230 rpm. Upon leaving the 3rd kneading portion, the resin melt was stranded, cooled and cut to obtain a particulate thermoplastic resin composition. Examples 16 & 17 and Comparative Examples 24 & 28.

With the feeds stated in Table 8, the procedures of Examples 9 to 14 were repeated, and the thus obtained kneaded melts were cooled and solidified to obtain particulate products. Each of the particulate products was again kneaded together with the crosslinking agent and said aid given in Table 8, and the kneaded melt was cooled and solidified into a particulate product, which was then preblended with the component (C) and additives in the proportions set forth in Table 8. The resulting blend was then fed into the same twin axial kneading extruder as used in Example 15 through its 3rd input inlet in an amount of 30 Kg per hour, in which it was kneaded as in Example 15, thereby obtaining a particulate thermoplastic resin composition.

COMPARATIVE EXAMPLES 21 AND 22 AND 25 AND 26

The components (B) and (C) in the quantities stated in Table 8 were preblended with the same additives as used in Examples 9 to 14, each in an amount of 0.05 parts by weight per a total of 100 parts by weight of the components (B) and (C). Each of the preblends was fed to the twin kneading extruder through its 2nd input inlet in an amount of 35 Kg per hour, in which it was kneaded together into a particulate thermoplastic resin composition.

EXAMPLES 19 TO 22

Each of mixtures of the components (A) and (B) was kneaded together in the amounts set out in Table 11 through a twin axial kneading extruder working at 200° C. and 150 rpm in a nitrogen atmosphere, and the melt was then cooled and solidified in particulate form. The obtained particles were hot-kneaded together with the specific amounts of the crosslinking agent and aid through the same twin kneading extruder at 240° C. and 280 rpm. The melt was then cooled and solidified in particulate form. Added to the obtained particles were specific quantities of the components (C) and (D) as well as 1,3,5-tris(4-t-butyl-3-hydroxy-2,6-dimethylbenzyl)cyanuric acid and tetrakis(methylene-3-(3',5'-di-t-butyl-4-hydroxyphenyl)propionate)methane, each in a quantity of 0.05 parts per a total of 100 parts of the components (A), (B) and (C). Then hot-kneading through the same twin axial kneading extruder working at 220° C. and 180 rpm was carried out. A particulate thermoplastic resin composition was thus obtained.

COMPARATIVE EXAMPLES 29 TO 37

With the feeds stated in Table 11, the procedures of the Examples 19 to 22 were repeated to obtain thermoplastic resin compositions.

COMPARATIVE EXAMPLES 38 AND 39

In the present examples, a batch of the components (A), (B) and (C) was kneaded together with the component (D), crosslinking agent and crosslinking aid at the same time. More exactly, 35 Kg per hour of each of the batches of Table 13 preblended together in a blender were fed to a kneader similar that used in Example 15 through its first input inlet with the cylinder operating at a temperature of 230° C. and the screw rotating at 230 rpm, thereby obtaining a thermoplastic resin composition. The results of evaluation was reported in Table 14.

Results of Evaluation

The thermoplastic resin compositions obtained in Examples 9 to 22 and Comparative Examples 15 to 39 were injection-molded to prepare test pieces, which were then used to measure their properties, as reported in Tables 9, 10, 12 and 14.

Molding Conditions

Molding Machine: M40A made by Meiki Seisakusho
Molding Temp.: 220° C.
Injection Pressure: 70% of the maximum pressure
Injection Speed: 70% of the maximum speed

Melt Flow Rate

Measured at 230° C. according to JIS K-7210 and expressed in terms of g/10 min.

Izod Impact Strength

Measured with a notch at 0° C. according to JIS K-7110 and expressed in terms of Kgf·cm/cm.

Flexural Modulus of Elasticity

Measured at 23° C. according to JIS K-7203 and expressed in terms of $Kgf/cm^2$.

TABLE 7

| | | Example | | | | | | Comp. Examples | | | | | |
|---|---|---|---|---|---|---|---|---|---|---|---|---|---|
| | | 9 | 10 | 11 | 12 | 13 | 14 | 15 | 16 | 17 | 18 | 19 | 20 |
| Component (A) | a-1 | 60 | 60 | 60 | 60 | 60 | 60 | — | — | 100 | 60 | 60 | 60 |
| | a-7 | 40 | 40 | 40 | 40 | 40 | 40 | — | — | — | 40 | 40 | 40 |
| Component (B) | b-1 | 150 | 150 | 200 | 300 | — | 150 | 100 | 100 | 150 | 150 | 150 | 150 |
| | b-2 | — | — | — | — | 150 | — | — | — | — | — | — | — |
| | Crosslinking agent | 0.1 | 0.2 | 0.2 | 0.2 | 0.2 | 0.1 | — | — | 0.1 | — | 0.2 | 0.2 |
| | Crosslinking Aid | 0.8 | 1.5 | 1.5 | 1.5 | 1.5 | 0.8 | — | — | 0.8 | — | 1.5 | 1.5 |
| Component (C) | a-5 | 400 | 400 | 400 | 700 | 400 | — | 733 | — | 400 | 400 | 40 | 2000 |
| | a-6 | — | — | — | — | — | 400 | — | 733 | — | — | — | — |
| Melt Flow Rates of a-1 & a-7 | | 1.6 | 1.6 | 1.6 | 1.6 | 1.6 | 1.6 | — | — | 0.6 | 1.6 | 1.6 | 1.6 |
| Mooney Viscosity of B | | 88 | 88 | 88 | 88 | 45 | 88 | 88 | 88 | 88 | 88 | 88 | 88 |

The crosslinking agent and crosslinking aid are indicated in terms of parts by weight relative to a total of 100 parts by weight of (A) + (B)
The component (C) is indicated in terms of parts by weight relative to a total of 100 parts by weight of (A) + (B)

TABLE 8

| | | Examples | | | | | | Comp. Examples | | | | | |
|---|---|---|---|---|---|---|---|---|---|---|---|---|---|
| | | 15 | 16 | 17 | 18 | 21 | 22 | 23 | 24 | 25 | 26 | 27 | 28 |
| Component (A) | a-1 | 60 | 60 | 60 | 60 | — | — | 100 | 100 | — | — | 100 | 100 |
| | a-7 | 40 | 40 | 40 | 40 | — | — | — | — | — | — | — | — |
| Component (B) | b-2 | 150 | 150 | 150 | 150 | 100 | 100 | 150 | 150 | 100 | 100 | 150 | 150 |
| | Crosslinking agent | 0.1 | 0.1 | 0.1 | 0.1 | — | — | 0.1 | 0.1 | — | — | 0.1 | 0.1 |
| | Crosslinking Aid | 0.8 | 0.8 | 0.8 | 0.8 | — | — | 0.8 | 0.8 | — | — | 0.8 | 0.8 |
| Component (C) | a-5 | 400 | 900 | — | — | 733 | 1567 | 400 | 900 | — | — | 400 | 900 |
| | a-6 | — | — | 400 | 900 | — | — | — | — | 733 | 1567 | 400 | 900 |

The crosslinking agent and crosslinking aid are indicated in terms of parts by weight relative to a total of 100 parts by weight of (A) + (B)
The component (C) is indicated in terms of parts by weight relative to a total of 100 parts by weight of (A) + (B)

TABLE 9

| | Example | | | | | | Comp. Examples | | | | | |
|---|---|---|---|---|---|---|---|---|---|---|---|---|
| | 9 | 10 | 11 | 12 | 13 | 14 | 15 | 16 | 17 | 18 | 19 | 20 |
| Melt Flow Rate | 3.5 | 3.6 | 3.6 | 4.2 | 3.9 | 5.7 | 4.8 | 8.1 | 3.6 | 4.3 | No molding achieved | 8.2 |
| Izod Impact Strength | 60 | 65 | 68 | 38 | 51 | 8.0 | 8.1 | 3.9 | 20.0 | 11.0 | | 8.0 |
| Flexural Modulus of | 9340 | 9360 | 9310 | 10780 | 9280 | 13560 | 9250 | 13500 | 9460 | 9300 | | 12000 |

TABLE 9-continued

| | Example | | | | | | Comp. Examples | | | | | |
|---|---|---|---|---|---|---|---|---|---|---|---|---|
| | 9 | 10 | 11 | 12 | 13 | 14 | 15 | 16 | 17 | 18 | 19 | 20 |
| Elasticity | | | | | | | | | | | | |

TABLE 10

| | Example | | | | Comp. Examples | | | | | | | |
|---|---|---|---|---|---|---|---|---|---|---|---|---|
| | 15 | 16 | 17 | 18 | 21 | 22 | 23 | 24 | 25 | 26 | 27 | 28 |
| Melt Flow Rate | 3.0 | 5.0 | 5.3 | 7.9 | 4.5 | 5.9 | 3.5 | 5.7 | 7.8 | 11.2 | 5.8 | 8.1 |
| Izod Impact Strength | 64 | 27.7 | 10.0 | 5.4 | 12.8 | 9.5 | 20.5 | 13.6 | 3.4 | 3.0 | 7.0 | 3.6 |
| Flexural Modulus of Elasticity | 9360 | 11050 | 13600 | 14500 | 9260 | 10700 | 9340 | 11100 | 13670 | 14420 | 13080 | 14900 |

TABLE 11

| | | Examples | | | | Comp. Examples | | | | | | | | |
|---|---|---|---|---|---|---|---|---|---|---|---|---|---|---|
| | | 19 | 20 | 21 | 22 | 29 | 30 | 31 | 32 | 33 | 34 | 35 | 36 | 37 |
| A | a-1 | 60 | 60 | 60 | 50 | 0 | 0 | 0 | 100 | 100 | 0 | 0 | 100 | 60 |
| | a-7 | 40 | 40 | 40 | 50 | 0 | 0 | 0 | 0 | 0 | 0 | 0 | 0 | 40 |
| B | b-1 | 150 | 180 | 150 | 180 | 0 | 100 | 100 | 150 | 150 | 100 | 100 | 150 | 150 |
| | Crosslinking Agent | 0.1 | 0.1 | 0.1 | 0.1 | 0 | 0 | 0 | 0.1 | 0.1 | 0 | 0 | 0.1 | 0.1 |
| | Crosslinking Aid | 0.6 | 0.8 | 0.6 | 0.8 | 0 | 0 | 0 | 0.6 | 0.6 | 0 | 0 | 0.6 | 0.6 |
| C | a-5 | 400 | 400 | 400 | 400 | 400 | 733 | 733 | 400 | 400 | 733 | 733 | 400 | 400 |
| D | d-1 | 30 | 15 | 0 | 0 | 0 | 30 | 15 | 30 | 15 | 0 | 0 | 0 | 130 |
| | d-2 | 0 | 0 | 30 | 15 | 0 | 0 | 0 | 0 | 0 | 30 | 15 | 30 | 0 |
| Melt Flow Rates of a-1 & a-2 | | 1.6 | 1.6 | 1.6 | 2.0 | — | — | — | 0.6 | 0.6 | — | — | 0.6 | 1.6 |
| Mooney Viscosity of b-1 | | 88 | 88 | 88 | 88 | — | 88 | 88 | 88 | 88 | 88 | 88 | 88 | 88 |

C and the crosslinking agent and crosslinking aid are indicated in terms of parts by weight relative to a total of 100 parts by weight of (A) + (B)
D is indicated in terms of parts by weight relative to a total of 100 parts by weight of (A) + (B) + (C)

TABLE 12

| | Examples | | | | Comp. Examples | | | | | | | | |
|---|---|---|---|---|---|---|---|---|---|---|---|---|---|
| | 19 | 20 | 21 | 22 | 29 | 30 | 31 | 32 | 33 | 34 | 35 | 36 | 37 |
| Melt Flow Rate | 2.1 | 2.8 | 2.0 | 2.6 | 8.1 | 2.4 | 3.1 | 2.3 | 3.0 | 2.1 | 3.0 | 2.5 | No molding achieved |
| Izod Impact Strength | 15.3 | 17.0 | 14.9 | 15.8 | 7.4 | 7.9 | 9.2 | 8.9 | 10.1 | 7.6 | 9.0 | 11.2 | |
| Flexural Modulus of Elasticity | 24300 | 17700 | 27400 | 19800 | 11800 | 25700 | 18200 | 24900 | 17900 | 27900 | 20100 | 27100 | |

TABLE 13

| | | Comp. Examples | |
|---|---|---|---|
| | | 38 | 39 |
| A | a-1 | 60 | 60 |
| | a-2 | 40 | 40 |
| B | b-1 | 200 | 150 |
| | Crosslinking agent | 0.2 | 0.1 |
| | Crosslinking Aid | 1.5 | 0.6 |
| C | a-5 | 400 | 400 |
| D | d-2 | — | 30 |

C and the crosslinking agent and crosslinking aid are indicated in terms of parts by weight relative to a total of 100 parts by weight of (A) + (B).
D is indicated in terms of parts by weight relative to a total of 100 parts by weight of (A) + (B) + (C).

TABLE 14

| | Comp. Examples | |
|---|---|---|
| | 38 | 39 |
| Melt Flow Rates | 4.9 | 3.5 |
| Izod Impact Strength | 16.5 | 9.0 |
| Flexural Modulus of Elasticity | 9380 | 26300 |

DESCRIPTION OF ELECTRON PHOTOMICROGRAPHS

Figure 3:
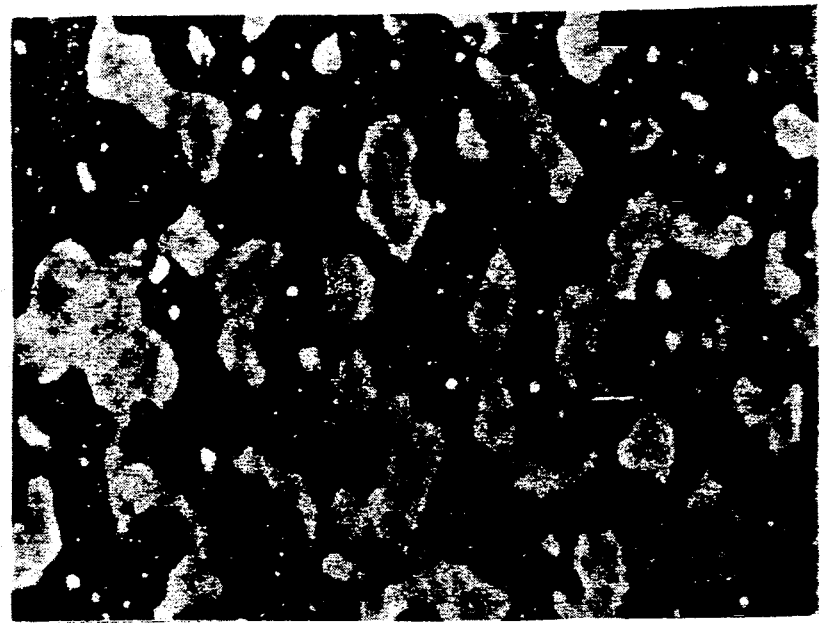
FIG. 3 is an electron photomicrograph showing the continuous phase—disperse phase structure of a composition obtained in Example 9 by kneading together a mixture (at 200° C. and 150 rpm)

FIG. 3 is a transmission type of electron photomicrograph of 7,500 magnification, showing the structure of the composition obtained in Example 9 by kneading together a mixture of the components (A) and (B) through the twin axial kneading extruder working at 200° C. and 150 rpm. This photomicrograph reveals that the dyed component (B) is in a continuous phase.

Figure 4:
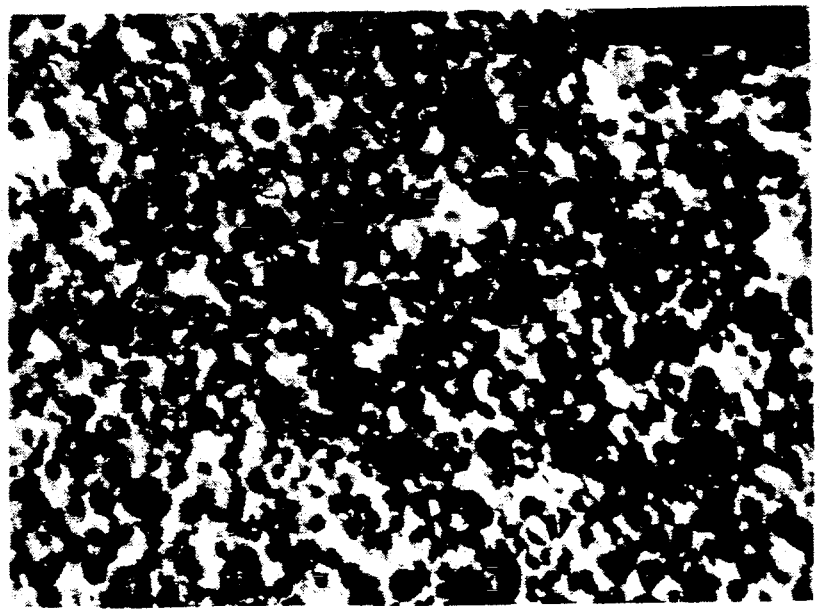
FIG. 4 is an electron photomicrograph showing the continuous phase—disperse phase structure of a composition obtained by adding to and kneading with a melt of Example 9 predetermined amounts of a crosslinking agent and a crosslinking aid (at 240° C. and 280 rpm).

FIG. 4 is a transmission type of electron photomicrograph of 15,000 magnification, showing the structure of the composition obtained in Example 9 by kneading at 240° C. and 280 rpm a molten mixture of the components (A) and (B) to which the given quantities of the crosslinking agent and aid were added.

From this photomicrograph, it can be seen that the component (A) is in a continuous phase; the continuous phase has been formed by a phase inversion from (B) to (A).

As already noted, the thermoplastic resin compositions according to this invention not only have high levels of moldability, rigidity and impact strength but also have excellent balance therebetween.

What is claimed is:
1. A thermoplastic resin composition comprising:
Component (A), in an amount of 100 parts by weight, which is a copolymer of propylene with at least one diene monomer selected from the monomers represented by the following formulae I and II or a mixture of said propylene copolymer with another crystalline propylene polymer, the component (A) containing the diene monomer polymerized in an amount of 0.05 to 20 mol %,

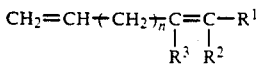

wherein
R¹ is a C₁₋₈ alkyl group,
R² and R³ are each independently a hydrogen atom or a C₁₋₈ alkyl group, provided that both can never be hydrogen atoms at the same time, and n is a number of 1 to 10,

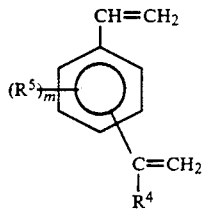

wherein
R⁴ is a hydrogen atom or a methyl group,
R⁵ is a C₁₋₆ hydrocarbyl group, and
m is a number of 0 or 1; and Component (B), in an amount of 90 to 300 parts by weight, which is an ethylene copolymer rubber that can be cross-linked by dynamic heat treatment with a cross-linking agent;

Component (C), in an amount of 50 to 1900 parts by weight relative to a total of 100 parts by weight of said components (A) and (B), which is a crystalline propylene polymer; and Component (D), in an amount of 0 to 100 parts by weight relative to a total of 100 parts by weight of said components (A), (B) and (C), which is a filler, said Component (A), said Component (B) and said Component (C) being in a blend of a structure consisting of a continuous phase and a disperse phase wherein said Component (A) is in the continuous phase and said Component (B) is in the disperse phase, said Component (C) being in the continuous phase, said structure having undergone a phase conversion upon dynamic heat treatment of the blend such that said Component (A) being in the continuous phase has once been in a disperse phase and said Component (B) being in the disperse phase has once been in a continuous phase.

2. The thermoplastic resin composition as claimed in claim 1, wherein the diene monomer of the formula [I] is selected from the group consisting of 6-methyl-1,5-heptadiene, 6-methyl-1,5-octadiene, 6-methyl-1,6-octadiene, 7-methyl-1,6-octadiene, and 8-methyl-1,7-nonadiene.

3. The thermoplastic resin composition as claimed in claim 2, wherein the diene monomer of the formula [I] is 6-methyl-1,6-octadiene or 7-methyl-1,6-octadiene.

4. The thermoplastic resin composition as claimed in claim 1, wherein the diene monomer of the formula [II] is selected from the group consisting of divinylbenzenes, isopropenylstyrenes and divinyltoluenes.

5. The thermoplastic resin composition as claimed in claim 4, wherein the diene monomer of the formula [II] is selected from divinylbenzenes.

6. The thermoplastic resin composition as claimed in claim 1, wherein the component (A) is either one of the copolymers of the formulae [I] and [II].

7. The thermoplastic resin composition as claimed in claim 1, wherein the component (A) is a mixture of a copolymer of propylene with a diene monomer of the formula [I] with a copolymer of propylene with a diene monomer of the formula [II].

8. The thermoplastic resin composition as claimed in claim 1, wherein the component (B) is selected from copolymers of ethylene-propylene-an unconjugated diene.

9. The thermoplastic resin composition as claimed in claim 1, wherein the component (B) has a Mooney viscosity ML₁₊₄ (100° C.) of 120 to 30.

10. The thermoplastic resin composition as claimed in claim 1, wherein the crystalline propylene polymer of the component (C) has a melt flow rate at 23° C. under a load of 2.16 Kg of 0.01 to 400 g/10 minutes.

11. The thermoplastic resin composition as claimed in claim 1, wherein the filler of the component (D) is selected from the group of a fibrous form of fillers, a plate- or spherical form of fillers, and a powder form of fillers.

12. A method of producing thermoplastic resin compositions comprising the steps of:
mixing together the following components (A) and (B) in a (A)/(B) weight ratio of 100/90 to 100/300 to obtain a blend of a structure consisting of a continuous phase and a disperse phase in which the component (B) is in the continuous phase, and
dynamically heat-treating said blend in the presence of a crosslinking agent to obtain a thermoplastic resin composition wherein the component (A) is in the continuous phase:
Component (A) which is a copolymer of propylene with at least one diene monomer selected from the monomers represented by the following general formulae [I and II] or a mixture of said propylene copolymer with another crystalline propylene polymer, the component (A) containing the diene monomer polymerized in an amount of 0.05 to 20 mol % and having a melt flow rate of 0.1 to 50 g/10 min;

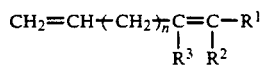

wherein
R¹ is a C₁₋₈ alkyl group,
R² and R³ are each independently a hydrogen atom or a C₁₋₈ alkyl group, provided that both can never be hydrogen atoms at the same time, and
n is a number of 1 to 10,

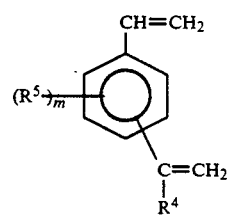

wherein
R⁴ is a hydrogen atom or a methyl group,
R⁵ is a C₁₋₆ hydrocarbyl group, and
m is a number Of 0 or 1; and Component (B) which is an ethylene copolymer rubber that can be crosslinked by dynamic heat treatment with a crosslinking agent and has a Mooney viscosity $ML_{1+4}$ of 120 to 30 as measured at 100° C.

13. The method as claimed in claim 12, wherein the diene monomer of the formula [I] is selected from the group consisting of 6-methyl-1,5-heptadiene, 6-methyl-1,5-octadiene, 6-methyl-1,6-octadiene, 7-methyl-1,6-octadiene, and 8-methyl-1,7-nonadiene.

14. The method as claimed in claim 13, wherein the diene monomer of the formula [I] is 6-methyl-1,6-octadiene or 7-methyl-1,6-octadiene.

15. The method as claimed in claim 12, wherein the diene monomer of the formula [I] is selected from the group consisting of divinylbenzenes, isopropenylstyrenes and divinyltoluenes.

16. The method as claimed in claim 15, wherein the diene monomer of the formula [II] is selected from divinylbenzenes.

17. The method as claimed in claim 12, wherein the component (A) is either one of the copolymers of the formulae [I] and [II].

18. The method as claimed in claim 12, wherein the component (A) is a mixture of a copolymer of propylene with a diene monomer of the formula [I] with a copolymer of propylene with a diene monomer of the formula [II].

19. The method as claimed in claim 1, wherein the component (B) is selected from copolymers of ethylene-propylene-an unconjugated diene.

20. The method as claimed in claim 12, wherein the component (B) has a Mooney viscosity $ML_{1+4}$ (100° C.) of 110 to 30.

21. A method of producing thermoplastic resin compositions comprising the steps of:

mixing together the following components (A) and (B) in a (A)/(B) weight ratio of 100/90 to 100/300 to obtain a blend of a structure consisting of a continuous phase and a disperse phase in which the component (B) is in the continuous phase, dynamically heat-treating said blend in the presence of a crosslinking agent to obtain a thermoplastic resin composition wherein the component (A) is in the continuous phase, adding to said thermoplastic resin composition obtained the following components (C) and (D) in amounts of, for the component (C), 50 to 1900 parts by weight relative to a total of 100 parts by weight of the components (A) and (B) and for the component (D), 0 to 100 parts by weight relative to a total of 100 parts by weight of the components (A), (B) and (C), and hot-kneading the resulting mixture;

Component (A) which is a copolymer of propylene with at least one diene monomer selected from the monomers represented by the following formulae I and II or a mixture of said propylene copolymer with another crystalline propylene polymer, the component (A) containing the diene monomer polymerized in an amount of 0.05 to 20 mol%, and having a melt flow rate of 0.1 to 50 g/10 min;

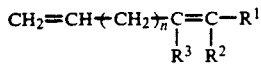

wherein $R^1$ is a $C_{1-8}$ alkyl group, $R^2$ and $R^3$ are each independently a hydrogen atom or a $C_{1-8}$ alkyl group, provided that both can never be hydrogen atoms at the same time, and n is a number of 1 to 10;

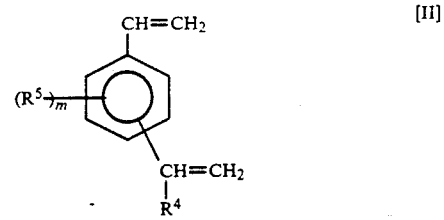

wherein $R^4$ is a hydrogen atom or a methyl group, $R^5$ is a $C_{1-6}$ hydrocarbyl group, and m is a number of 0 or 1;

Component (B) which is an ethylene copolymer rubber that can be crosslinked by dynamic heat treatment with a crosslinking agent and has a Mooney viscosity $ML_{1+4}$ of 120 to 30 as measured at 100° C.;

Component (C) which is a crystalline propylene polymer; and

Component (D) which is a filler.

22. The method as claimed in claim 21, wherein the diene monomer of the formula [I] is selected from the group consisting of 6-methyl-1,5-heptadiene, 6-methyl-1,5-octadiene, 6-methyl-1,6-octadiene, 7-methyl-1,6-octadiene, and 8-methyl-1,7-nonadiene.

23. The method as claimed in claim 22, wherein the diene monomer of the formula [I] is 6-methyl-1,6-octadiene or 7-methyl-1,6-octadiene.

24. The method as claimed in claim 21, wherein the diene monomer of the formula [II] is selected from the group consisting of divinylbenzenes, isopropenylstyrenes and divinyltoluenes.

25. The method as claimed in claim 24, wherein the diene monomer of the formula [II] is selected from divinylbenzenes.

26. The method as claimed in claim 21, wherein the component (A) is either one of the copolymers of the formulae [I] and [II].

27. The method as claimed in claim 21, wherein the component (A) is a mixture of a copolymer of propylene with a diene monomer of the formula [I] with a copolymer of propylene with a diene monomer of the formula [II].

28. The method as claimed in claim 21, wherein the component (B) is selected from copolymers of ethylene-propylene-an unconjugated diene.

29. The method as claimed in claim 21, wherein the component (B) has a Mooney viscosity $ML_{1+4}$ (100° C.) of 110 to 30.

30. The method as claimed in claim 21, wherein the crystalline propylene polymer of the component (C) has a melt flow rate at 23° C. under a load of 2.16 Kg of 0.01 to 400 g/10 minutes.

31. The method as claimed in claim 21, wherein the filler of the component (D) is selected from the group of fibrous fillers, plate- or spherical fillers, and powder fillers.

32. The method as claimed in claim 21, wherein the crosslinking agent is selected from organic peroxides.

33. A thermoplastic resin composition produced by a method comprising the steps of:
  mixing together the following components (A) and (B) in a (A)/(B) weight ratio of 100/90 to 100/300 to obtain a blend of a structure consisting of a continuous phase and a disperse phase in which the component (B) is in the continuous phase, and
  dynamically heat-treating said blend in the presence of a cross-linking agent to obtain a thermoplastic resin composition wherein a phase conversion takes place so that the component (A) is in the continuous phase;
  Component (A) which is a copolymer resin consisting essentially of propylene and at least one diene monomer selected from the monomers represented by the following formulae [I] and [II] or a mixture of said propylene copolymer resin with another crystalline propylene copolymer, the component (A) containing the diene monomer polymerized in an amount of 0.05 to 20 mol % and having a melt flow rate of 0.1 to 50 g/10 min,

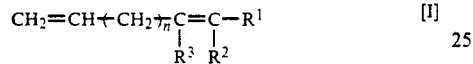

wherein
  $R^1$ is a $C_{1-8}$ alkyl group,
  $R^2$ and $R^3$ are each independently a hydrogen atom or a $C_{1-8}$ alkyl group, provided that both can never be hydrogen atoms at the same time, and n is a number of 1 to 10,

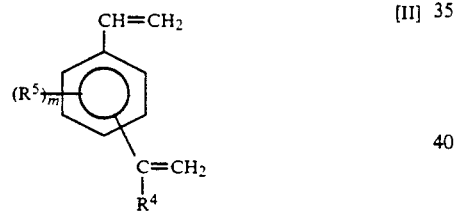

wherein $R^4$ is a hydrogen atom or a methyl group, $R^5$ is a $C_{1-6}$ hydrocarbyl group, and m is a number of 0 or 1; and
  Component (B) which is an ethylene copolymer rubber that can be cross-linked by dynamic heat treatment with a cross-linking agent and has a Mooney viscosity $ML_{1+4}$ of 120 to 30 as measured at 100° C.

34. The thermoplastic resin composition according to claim 33, wherein the diene monomer of the formulae is selected from the group consisting of 6-methyl-1,5-heptadiene, 6-methyl-1,5-octadiene, 6-methyl-1,6-octadiene, 7-methyl-1,6-octadiene, and 8-methyl-1,7-nonadiene.

35. The thermoplastic resin composition according to claim 34, wherein the diene monomer of the formulae [I] is 6-methyl-1,6-octadiene or 7-methyl-1,6-octadiene.

36. The thermoplastic resin composition according to claim 33, wherein the diene monomer of the formula [II] is selected from the group consisting of divinylbenzenes, isopropenylstyrenes and divinyltolunes.

37. The thermoplastic resin composition according to claim 36, wherein the diene monomer of the formulae [II] is selected from divinylbenzenes.

38. The thermoplastic resin composition according to claim 33, wherein the component (A) is either one of the copolymers of the formulae [I] and [II].

39. The thermoplastic resin composition according to claim 33, wherein the component (A) is a mixture of a copolymer of propylene with a diene monomer of the formulae [I] with a copolymer of propylene with a diene monomer of the formulae [II].

40. The thermoplastic resin composition according to claim 33, wherein the component (B) is selected from copolymers of ethylene-propylene-an unconjugated diene.

41. The thermoplastic resin composition according to claim 33, wherein the component (B) has a Mooney viscosity $ML_{1+4}$ (100° C.) of 110 to 30.

42. A thermoplastic resin composition produced by a method comprising the steps of:
  mixing together the following components (A) and (B) in a (A)/(B) weight ratio of 100/90 to 100/300 to obtain a blend of a structure consisting of a continuous phase and a disperse phase in which the component (B) is in the continuous phase,
  dynamically heat-treating said blend in the presence of a cross-linking agent to obtain a thermoplastic resin composition wherein a phase conversion takes place so that the component (A) is in the continuous phase,
  adding to said thermoplastic resin composition obtained the following components (C) and (D) in amounts of, for the component (C), 50 to 1900 parts by weight relative to a total of 100 parts by weight of the components (A) and (B) and for the component (D), 0 to 100 parts by weight of the components (A), (B) and (C), and
  hot-kneading the resulting mixture;
  Component (A) which is a copolymer resin consisting essentially of propylene and at least one diene monomer selected from the monomers represented by the following formulae [I] and [II] or a mixture of said propylene copolymer resin with another crystalline propylene copolymer, the component (A) containing the diene monomer polymerized in an amount of 0.05 to 20 mol % and having a melt flow rate of 0.1 to 50 g/10 min,

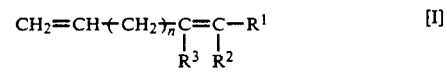

wherein
  $R^1$ is a $C_{1-8}$ alkyl group,
  $R^2$ and $R^3$ are each independently a hydrogen atom or a $C_{1-8}$ alkyl group, provided that both can never be hydrogen atoms at the same time, and n is a number of 1 to 10,

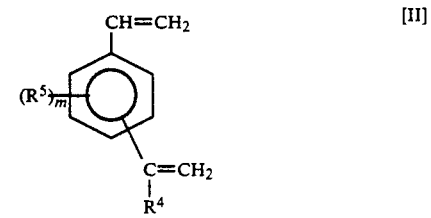

wherein
  $R^4$ is a hydrogen atom or a methyl group, $R^5$ is a $C_{1-6}$ hydrocarbyl group, and m is a number of 0 or 1; and Component (B) which is an ethylene copolymer rubber that can be cross-linked by dynamic heat treatment with a cross-linking agent and has a Mooney viscosity $ML_{1+4}$ of 120 to 30 as measured at 100° C.;

Component (C) which is a crystalline propylene polymer; and

Component (D) which is a filler.

43. The thermoplastic resin composition according to claim 42, wherein the diene monomer of the formulae [I] is selected from the group consisting of 6-methyl-1,5-heptadiene, 6-methyl-1,5-octadiene, 6-methyl-1,6-octadiene, 7-methyl-1,6-octadiene, and 8-methyl-1,7-nonadiene.

44. The thermoplastic resin composition according to claim 43, wherein the diene monomer of the formulae [I] is 6-methyl-1,6-octadiene or 7-methyl-1,6-octadiene.

45. The thermoplastic resin composition according to claim 42, wherein the diene monomer of the formulae [II] is selected from the group consisting of divinylbenzenes, isopropenylstyrenes and divinylbenzenes.

46. The thermoplastic resin composition according to claim 45, wherein the diene monomer of the formulae [II] is selected from divinylbenzenes.

47. The thermoplastic resin composition according to claim 42, wherein the component (A) is either one of the copolymers of the formulae [I] and [II].

48. The thermoplastic resin composition according to claim 42, wherein the component (A) is a mixture of a copolymer of propylene with a diene monomer of the formulae [I] with a copolymer of propylene with a diene monomer of the formulae [II].

49. The thermoplastic resin composition according to claim 42, wherein the component (B) is selected from copolymers of ethylene-propylene-an unconjugated diene.

50. The thermoplastic resin composition according to claim 42, wherein the component (B) has a Mooney viscosity $ML_{1+4}$ (100° C.) of 110 to 30.

51. The thermoplastic resin composition according to claim 42, wherein the crystalline propylene polymer of the component (C) has a melt flow rate at 23° C. under a load of 2.16 Kg of 0.01 to 400 g/10 minutes.

52. The thermoplastic resin composition according to claim 42, wherein the filler of the component (D) is selected from the group consisting of fibrous fillers, plate- or spherical fillers, and powder fillers.

53. The thermoplastic resin composition according to claim 42, wherein the cross-linking agent is selected from organic peroxides.

54. The thermoplastic resin composition according to claim 35, wherein the diene monomer of formulae [I] is 7-methyl-1,6-octodiene.

55. The thermoplastic resin composition according to claim 44, wherein the diene monomer of formulae [I] is 7-methyl-1,6-octadiene.

* * * * *